United States Patent
Zheng (10) Patent No.: US 10,182,132 B2
(45) Date of Patent: Jan. 15, 2019

(54) METHOD, APPARATUS AND SYSTEM FOR COMMUNICATION BETWEEN OPENFLOW DEVICE AND IP NETWORK DEVICE

(71) Applicant: Huawei Technologies Co., Ltd., Shenzhen (CN)

(72) Inventor: Xiuli Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 15/333,714

(22) Filed: Oct. 25, 2016

(65) Prior Publication Data

US 2017/0041229 A1    Feb. 9, 2017

Related U.S. Application Data

(63) Continuation of application No. PCT/CN2014/078033, filed on May 21, 2014.

(51) Int. Cl.
*H04L 29/06* (2006.01)

(52) U.S. Cl.
CPC ............... *H04L 69/16* (2013.01); *H04L 69/08* (2013.01); *H04L 69/22* (2013.01)

(58) Field of Classification Search
CPC .......... H04L 29/06095; H04L 29/0653; H04L 45/74; H04L 49/3009; H04L 49/309;
(Continued)

(56) References Cited

U.S. PATENT DOCUMENTS

2013/0148667 A1   6/2013 Hama et al.
2013/0268686 A1*  10/2013 Wang .................. H04L 65/1069
                                                        709/228
(Continued)

FOREIGN PATENT DOCUMENTS

CN       102546351 A     7/2012
CN       103152264 A     6/2013
(Continued)

OTHER PUBLICATIONS

Machine Translation and Abstract of Chinese Publication No. CN102546351, Jul. 4, 2012, 18 pages.
(Continued)

*Primary Examiner* — Dady Chery
(74) *Attorney, Agent, or Firm* — Conley Rose, P.C.

(57) ABSTRACT

Embodiments of the present disclosure provide a method, an apparatus, and a system for communication between an OpenFlow device and an IP network device. According to the embodiments of the present disclosure, an OpenFlow control message is used to carry payload information, a field value that is in a packet header and that is used to determine a protocol type, and identification information of the IP network device that are in a TCP/IP data packet of an IP network control plane protocol message in order to encapsulate the IP network control plane protocol message into the OpenFlow control message for transmission between an OFS and an OFC, such that communication between the OpenFlow device and the IP network device can be implemented, the OFC does not need to process a TCP/IP protocol stack twice, and extra overheads of the OFC are avoided.

18 Claims, 4 Drawing Sheets

(58) Field of Classification Search
CPC ..... H04L 12/5689; H04L 45/00; H04L 45/10; H04L 45/22; H04L 49/25; H04L 49/256; H04J 14/0267; H04J 2203/0023; H04J 2203/0053; H04M 2215/42
See application file for complete search history.

(56) References Cited

U.S. PATENT DOCUMENTS

| | | | | |
|---|---|---|---|---|
| 2014/0096183 | A1* | 4/2014 | Jain | H04L 12/4641 726/1 |
| 2014/0328180 | A1* | 11/2014 | Kim | H04L 47/21 370/235.1 |
| 2016/0036514 | A1* | 2/2016 | Saida | H04W 76/10 455/405 |

FOREIGN PATENT DOCUMENTS

| | | |
|---|---|---|
| CN | 103210615 A | 7/2013 |
| CN | 103259728 A | 8/2013 |
| WO | 2012023604 A1 | 2/2012 |

OTHER PUBLICATIONS

Machine Translation and Abstract of Chinese Publication No. CN103152264, Jun. 12, 2013, 30 pages.
Foreign Communication From a Counterpart Application, Chinese Application No. 201480033012.2, Chinese Office Action dated Dec. 26, 2017, 6 pages.
"OpenFlow Switch Specification," Version 1.3.4, (Protocol Version 0x04), Open Networking Foundation, Mar. 27, 2014, 171 pages.
Foreign Communication From a Counterpart Application, PCT Application No. PCT/CN2014/078033, English Translation of International Search Report dated Jan. 28, 2015, 2 pages.
Foreign Communication From a Counterpart Application, PCT Application No. PCT/CN2014/078033, English Translation of Written Opinion dated Jan. 28, 2015, 5 pages.

* cited by examiner

METHOD, APPARATUS AND SYSTEM FOR COMMUNICATION BETWEEN OPENFLOW DEVICE AND IP NETWORK DEVICE

CROSS-REFERENCE TO RELATED APPLICATIONS

This application is a continuation of international patent application number PCT/CN2014/078033 filed on May 21, 2014, which is incorporated by reference.

TECHNICAL FIELD

Embodiments of the present disclosure relate to the field of communications technologies, and in particular, to a method, an apparatus, and a system for communication between an OpenFlow device and an Internet Protocol (IP) network device.

BACKGROUND

With constant development of a software-defined networking (SDN)/OpenFlow network, a scenario in which an SDN/OpenFlow network and a conventional IP network will coexist in a period of time in the future. The OpenFlow network is one type of SDN network in which the OpenFlow is used as a protocol. How to implement communication between an OpenFlow network/device and a conventional IP network/device in a case in which an existing conventional IP network/device is not modified is an important subject in the SDN/OpenFlow network.

An existing solution is an edge OpenFlow switch exchanges a conventional IP network control plane protocol message with an IP switch/router directly connected to the edge OpenFlow switch, for example, an open shortest path first (OSPF) link state update message (LSU), a Border Gateway Protocol (BGP) update message, or a Label Distribution Protocol (LDP) broadcast message. After receiving the conventional IP network control plane protocol message sent from the IP switch/router, the edge OpenFlow switch encapsulates an entire Transmission Control Protocol/Internet Protocol (TCP/IP) data packet that carries the message into a Packet In message and reports the Packet In message to an OpenFlow controller (OFC). After receiving the Packet In message, the OFC parses the Packet In message to obtain valid information and sends the valid information obtained by means of parsing to a corresponding IP network control plane protocol module for processing. To enable an OpenFlow system, which includes the OpenFlow switch and a corresponding controller, to send the conventional IP network control plane protocol message to the IP switch/router directly connected to the OpenFlow system, an IP network control plane protocol module of the OFC first constructs a conventional IP network control plane protocol message, the OFC then encapsulates the message into a Packet Out message, the OFC then sends the encapsulated Packet Out message to the edge OpenFlow switch, and the edge OpenFlow switch extracts the corresponding conventional IP network control plane protocol message from the received Packet Out message and forwards the conventional IP network control plane protocol message from a physical port specified by the Packet Out message to the IP switch/router directly connected to the edge OpenFlow switch.

In the foregoing processing process, for the IP network control plane protocol message encapsulated into the Packet In message/Packet Out message, the IP network control plane protocol message is generally carried on a TCP layer. In this way, the OFC needs to process a TCP/IP protocol stack twice, but it is extremely difficult to process two layers of TCP/IP protocol stacks. As a result, extra overheads are brought to the OFC, and processing a critical event using a limited computing resource by the OFC is affected.

SUMMARY

Embodiments of the present disclosure provide a method, an apparatus, and a system for communication between an OpenFlow device and an IP network device, which resolves a transmission problem of an IP routing message on an OpenFlow network control plane, such that communication between the OpenFlow device and the IP network device can be implemented, an OFC does not need to process a TCP/IP protocol stack twice, and extra overheads of the OFC are avoided.

According to a first aspect, an embodiment of the present disclosure provides a method for communication between an OpenFlow device and an IP network device, including receiving, by an OpenFlow switch (OFS), an IP network control plane protocol message sent by the IP network device, converting, by the OFS, the IP network control plane protocol message into an OpenFlow control message, where the OpenFlow control message is used to carry information about a Transmission Control Protocol/Internet Protocol TCP/IP data packet of the IP network control plane protocol message, and the information about the TCP/IP data packet includes payload information, a field value that is in a packet header and that is used to determine a protocol type, and identification information of the IP network device, and sending, by the OFS, the OpenFlow control message to an OFC, such that after receiving the OpenFlow control message, the OFC enables, according to the protocol type carried in the OpenFlow control message, a corresponding switched network control plane protocol component to process the OpenFlow control message.

In a first possible implementation manner of the first aspect, the converting, by the OFS, the IP network control plane protocol message into an OpenFlow control message includes encapsulating, by the OFS, the identification information of the IP network device in the TCP/IP data packet of the IP network control plane protocol message into an address field in the OpenFlow control message, where the identification information of the IP network device is a source IP address and/or a source Media Access Control (MAC) address in the TCP/IP data packet, correspondingly encapsulating, by the OFS, the field value that is in the packet header of the TCP/IP data packet and that is used to determine the protocol type into a field that is used to identify a protocol type and that is in the OpenFlow control message, and encapsulating, by the OFS, the payload information in the TCP/IP data packet into an information field in the OpenFlow control message.

With reference to the first possible implementation manner of the first aspect, in a second possible implementation manner of the first aspect, a packet header field in the OpenFlow control message includes the following information: an Ethernet type, an IP Protocol type number, and MAC addresses, IP addresses, and destination TCP port numbers of the OFS and the OFC.

According to a second aspect, an embodiment of the present disclosure provides a method for communication between an OpenFlow device and an IP network device, including receiving, by an OFS, an OpenFlow control message sent by an OFC, where the OpenFlow control message includes a routing message, and the routing message is payload information of an IP network control plane protocol message constructed by the OFC, converting, by the OFS, the OpenFlow control message into the IP network control plane protocol message, and sending, by the OFS, the IP network control plane protocol message obtained through conversion to the IP network device.

In a first possible implementation manner of the second aspect, before the converting, by the OFS, the OpenFlow control message into the IP network control plane protocol message, the method further includes determining, by the OFS according to a message type in the OpenFlow control message, that the payload information of the IP network control plane protocol message is encapsulated in the OpenFlow control message.

With reference to the second aspect or the first possible implementation manner of the second aspect, in a second possible implementation manner of the second aspect, if the OpenFlow control message further includes a destination IP address corresponding to the IP network control plane protocol message, the converting, by the OFS, the OpenFlow control message into the IP network control plane protocol message includes finding, by the OFS, device identification information of the IP network device from a link connection database according to the destination IP address, where the device identification information includes at least an IP address and/or a (MAC) address, assigning, by the OFS, the found device identification information of the IP network device to a destination IP network device identification information field in a TCP/IP data packet of the IP network control plane protocol message, assigning, by the OFS, a field value that is used to identify a protocol type and that is in the OpenFlow control message to a corresponding protocol type field in a packet header of the TCP/IP data packet of the IP network control plane protocol message, encapsulating, by the OFS, an information field in the OpenFlow control message into a payload of the TCP/IP data packet of the IP network control plane protocol message, and respectively assigning, by the OFS, an IP address, a MAC address, and a TCP port number of the OFS to a source IP address, a source MAC address, and a TCP port number of the TCP/IP data packet of the IP network control plane protocol message.

With reference to the second possible implementation manner of the second aspect, in a third possible implementation manner of the second aspect, the sending, by the OFS, the IP network control plane protocol message obtained through conversion to the IP network device includes finding, by the OFS from the link connection database according to the destination IP address, a physical port that connects the OFS to the IP network device and sending, by the OFS, the IP network control plane protocol message obtained through conversion to the IP network device using the found physical port.

According to a third aspect, an embodiment of the present disclosure provides an OFS, including at least one first logical interface connected to an IP network device, at least one second logical interface connected to an OFC, and a message converter, where the first logical interface is configured to receive an IP network control plane protocol message sent by the IP network device. The message converter is configured to convert the IP network control plane protocol message into an OpenFlow control message, where the OpenFlow control message is used to carry information about a TCP/IP data packet of the IP network control plane protocol message, and the information about the TCP/IP data packet includes payload information, a field value that is in a packet header and that is used to determine a protocol type, and identification information of the IP network device, and the second logical interface is configured to send the OpenFlow control message to the OFC, such that after receiving the OpenFlow control message, the OFC enables, according to the protocol type carried in the OpenFlow control message, a corresponding switched network control plane protocol component to process the OpenFlow control message.

In a first possible implementation manner of the third aspect, that the message converter is configured to convert the IP network control plane protocol message into an OpenFlow control message is specifically meaning that the message converter is configured to encapsulate the identification information of the IP network device in the TCP/IP data packet of the IP network control plane protocol message into an address field in the OpenFlow control message, where the identification information of the IP network device is a source IP address and/or a source MAC address in the TCP/IP data packet, correspondingly encapsulate the field value in the packet header of the TCP/IP data packet and is used to determine the protocol type into a field used to identify a protocol type and is in the OpenFlow control message, and encapsulate the payload information in the TCP/IP data packet into an information field in the OpenFlow control message.

With reference to the first possible implementation manner of the third aspect, in a second possible implementation manner of the third aspect, a packet header field in the OpenFlow control message includes information such as an Ethernet type, an IP Protocol type number, and MAC addresses, IP addresses, and destination TCP port numbers of the OFS and the OFC.

According to a fourth aspect, an embodiment of the present disclosure provides an OFS, including at least one first logical interface connected to an IP network device, at least one second logical interface connected to an OFC, and a message converter, where the second logical interface is configured to receive an OpenFlow control message sent by the OFC, where the OpenFlow control message includes a routing message, and the routing message is payload information of an IP network control plane protocol message constructed by the OFC, the message converter is configured to convert the OpenFlow control message into the IP network control plane protocol message, and the first logical interface is configured to send the IP network control plane protocol message obtained through conversion to the IP network device.

In a first possible implementation manner of the fourth aspect, the message converter is further configured to determine, according to a message type in the OpenFlow control message, that the payload information of the IP network control plane protocol message is encapsulated in the OpenFlow control message before converting the OpenFlow control message into the IP network control plane protocol message.

With reference to the fourth aspect or the first possible implementation manner of the fourth aspect, in a second possible implementation manner of the fourth aspect, the OFS further includes a link connection database memory, where the link connection database memory is configured to store the control message in a link connection database, if the OpenFlow control message further includes a destination IP address corresponding to the IP network control plane protocol message, the message converter is configured to convert the OpenFlow control message into the IP network control plane protocol message, and the message converter is configured to find device identification information of the IP network device from the link connection database according to the destination IP address, where the device identification information includes at least an IP address and/or a MAC address, assign the found device identification information of the IP network device to a destination IP network device identification information field in a TCP/IP data packet of the IP network control plane protocol message, assign a field value that is used to identify a protocol type and that is in the OpenFlow control message to a corresponding protocol type field in a packet header of the TCP/IP data packet of the IP network control plane protocol message, encapsulate an information field in the OpenFlow control message into a payload of the TCP/IP data packet of the IP network control plane protocol message, and respectively assign an IP address, a MAC address, and a TCP port number of the OFS to a source IP address, a source MAC address, and a TCP port number of the TCP/IP data packet of the IP network control plane protocol message.

With reference to the second possible implementation manner of the fourth aspect, in a third possible implementation manner of the fourth aspect, that the first logical interface is configured to find, from the link connection database according to the destination IP address, a physical port that connects the OFS to the IP network device, and send the IP network control plane protocol message obtained through conversion to the IP network device using the found physical port.

According to a fifth aspect, an embodiment of the present disclosure provides a system for communication between an OpenFlow device and an IP network device, including the OFS and the OFC according to the third aspect or the first possible implementation manner of the third aspect or the second possible implementation manner of the third aspect, where the OFC is configured to receive an OpenFlow control message, and enable, according to a protocol type carried in the OpenFlow control message, a corresponding switched network control plane protocol component to process the OpenFlow control message, or including the OFS and the OFC according to the fourth aspect or the first possible implementation manner of the fourth aspect or the second possible implementation manner of the fourth aspect or the fourth possible implementation manner of the fourth aspect, where the OFC is configured to send an OpenFlow control message to the OFS, where the OpenFlow control message includes a routing message, and the routing message is payload information of an IP network control plane protocol message constructed by the OFC.

According to a sixth aspect, an embodiment of the present disclosure provides an OFS, including a receiver connected to an IP network device, and a transmitter, a memory, and a processor that are connected to an OFC, where the receiver is configured to receive an IP network control plane protocol message sent by the IP network device, the memory is configured to store program code, the processor is configured to invoke the program code stored in the memory to perform the following step: converting the IP network control plane protocol message into an OpenFlow control message, where the OpenFlow control message is used to carry information about a TCP/IP data packet of the IP network control plane protocol message, and the information about the TCP/IP data packet includes payload information, a field value that is in a packet header and that is used to determine a protocol type, and identification information of the IP network device, and the transmitter is configured to send the OpenFlow control message to the OFC, such that after receiving the OpenFlow control message, the OFC enables, according to the protocol type carried in the OpenFlow control message, a corresponding switched network control plane protocol component to process the OpenFlow control message.

In a first possible implementation manner of the sixth aspect, the converting, by the processor, the IP network control plane protocol message into an OpenFlow control message includes encapsulating the identification information of the IP network device in the TCP/IP data packet of the IP network control plane protocol message into an address field in the OpenFlow control message, where the identification information of the IP network device is a source IP address and/or a source MAC address in the TCP/IP data packet, correspondingly encapsulating the field value that is in the packet header of the TCP/IP data packet and that is used to determine the protocol type into a field that is used to identify a protocol type and that is in the OpenFlow control message, and encapsulating the payload information in the TCP/IP data packet into an information field in the OpenFlow control message.

With reference to the first possible implementation manner of the sixth aspect, in a second possible implementation manner of the sixth aspect, a packet header field in the OpenFlow control message includes information such as an Ethernet type, an IP Protocol type number, and MAC addresses, IP addresses, and destination TCP port numbers of the OFS and the OFC.

According to a seventh aspect, an embodiment of the present disclosure provides an OFS, including a transmitter connected to an IP network device, and a receiver, a memory, and a processor that are connected to an OFC, where the receiver is configured to receive an OpenFlow control message sent by the OFC, where the OpenFlow control message includes a routing message, and the routing message is payload information of an IP network control plane protocol message constructed by the OFC, the memory is configured to store program code, the processor is configured to invoke the program code stored in the memory, to perform the following step: converting the OpenFlow control message into the IP network control plane protocol message, and the transmitter is configured to send the IP network control plane protocol message obtained through conversion to the IP network device.

In a first possible implementation manner of the seventh aspect, the method performed by the processor further includes determining, according to a message type in the OpenFlow control message, that the payload information of the IP network control plane protocol message is encapsulated in the OpenFlow control message before converting the OpenFlow control message into the IP network control plane protocol message.

With reference to the seventh aspect or the first possible implementation manner of the seventh aspect, in a second possible implementation manner of the seventh aspect, the memory is further configured to store the OpenFlow control message in a link connection database, and if the OpenFlow control message further includes a destination IP address corresponding to the IP network control plane protocol message, the converting, by the processor, the OpenFlow control message into the IP network control plane protocol message includes finding device identification information of the IP network device from the link connection database according to the destination IP address, where the device identification information includes at least an IP address and/or a MAC address, assigning the found device identification information of the IP network device to a destination IP network device identification information field in a TCP/IP data packet of the IP network control plane protocol message, assigning a field value that is used to identify a protocol type and that is in the OpenFlow control message to a corresponding protocol type field in a packet header of the TCP/IP data packet of the IP network control plane protocol message, encapsulating an information field in the OpenFlow control message into a payload of the TCP/IP data packet of the IP network control plane protocol message, and respectively assigning an IP address, a MAC address, and a TCP port number of the OFS to a source IP address, a source MAC address, and a TCP port number of the TCP/IP data packet of the IP network control plane protocol message.

With reference to the second possible implementation manner of the seventh aspect, in a third possible implementation manner of the seventh aspect, the transmitter is configured to send the IP network control plane protocol message obtained through conversion to the IP network device includes finding, from the link connection database according to the destination IP address, a physical port that connects the OFS to the IP network device, and sending the IP network control plane protocol message obtained through conversion to the IP network device using the found physical port.

According to an eighth aspect, an embodiment of the present disclosure provides a system for communication between an OpenFlow device and an IP network device, including the OFS and the OFC according to the sixth aspect or the first possible implementation manner of the sixth aspect or the second possible implementation manner of the sixth aspect, where the OFC is configured to receive an OpenFlow control message, and enable, according to a protocol type carried in the OpenFlow control message, a corresponding switched network control plane protocol component to process the OpenFlow control message, or including the OFS and the OFC according to the seventh aspect or the first possible implementation manner of the seventh aspect or the second possible implementation manner of the seventh aspect or the third possible implementation manner of the seventh aspect, where the OFC is configured to send an OpenFlow control message to the OFS, where the OpenFlow control message includes a routing message, and the routing message is payload information of an IP network control plane protocol message constructed by the OFC.

The embodiments of the present disclosure provide the method, the apparatus, and the system for communication between an OpenFlow device and an IP network device. According to the embodiments of the present disclosure, an OpenFlow control message is used to carry payload information, a field value that is in a packet header and that is used to determine a protocol type, and identification information of the IP network device that are in a TCP/IP data packet of an IP network control plane protocol message in order to encapsulate the IP network control plane protocol message into the OpenFlow control message for transmission between an OFS and an OFC, such that communication between the OpenFlow device and the IP network device can be implemented, the OFC does not need to process a TCP/IP protocol stack twice, and extra overheads of the OFC are avoided.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Embodiments of the present disclosure provide a method, an apparatus, and a system for communication between an OpenFlow device and an IP network device, such that communication between the OpenFlow device and the IP network device can be implemented, an OFC does not need to process a TCP/IP protocol stack twice, and extra overheads of the OFC are avoided. On the other hand, in some approaches, a Packet In message and a Packet Out message in the OpenFlow specification are used to process a data packet forwarded on a data plane, but an IP network control plane protocol message between an OpenFlow switch and a non OpenFlow switch is a control plane message. In some approaches, a control plane message between the OpenFlow switch and an IP switch/router directly connected to the OpenFlow switch and common user data are transmitted together as a same type of message, which does not facilitate distinguishing and processing of the two types of messages. The embodiments of the present disclosure may further resolve the problem. The OpenFlow device disclosed herein refers to an OpenFlow switch controlled by an OpenFlow controller, and uses the OpenFlow as a communication protocol. The IP network device refers to a switch/router in a conventional IP network, and uses the IP protocol as a communication protocol. The following describes a method for communication between an OpenFlow device and an IP network device provided in the embodiments of the present disclosure in detail with reference to the accompanying drawings.

Figure 1:
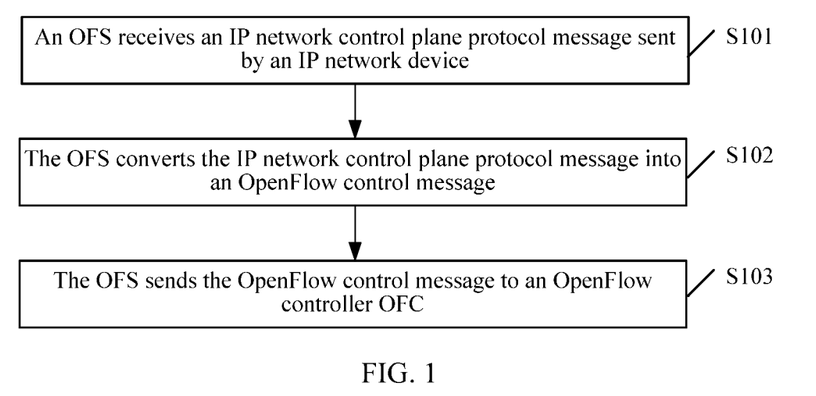
FIG. 1 is a flowchart of Embodiment 1 of a method for communication between an OpenFlow device and an IP network device according to the present disclosure.

FIG. 1 is a flowchart of Embodiment 1 of a method for communication between an OpenFlow device and an IP network device according to an embodiment of the present disclosure. The OpenFlow device and the IP network device communicate with each other using an edge OpenFlow switch (eOFS) connected to an OFC. The eOFS is an OpenFlow switch directly connected to a conventional IP switch/router, and the eOFS is controlled by one or more controllers. In an embodiment, an OFS is an eOFS. This embodiment is described using the OFS to execute the method. As shown in FIG. 1, the method in this embodiment may include the following steps.

Step S101: The OFS receives an IP network control plane protocol message sent by the IP network device.

Step S102: The OFS converts the IP network control plane protocol message into an OpenFlow control message, where the OpenFlow control message is used to carry information about a TCP/IP data packet of the IP network control plane protocol message, and the information about the TCP/IP data packet includes payload information, a field value that is in a packet header and that is used to determine a protocol type, and identification information of the IP network device.

Step S103: The OFS sends the OpenFlow control message to the OFC, such that after receiving the OpenFlow control message, the OFC enables, according to the protocol type carried in the OpenFlow control message, a corresponding switched network control plane protocol component to process the OpenFlow control message.

This embodiment is a processing process when the IP network device sends a message to the OpenFlow device.

The converting, by the OFS, the IP network control plane protocol message into an OpenFlow control message may include encapsulating, by the OFS, the identification information of the IP network device in the TCP/IP data packet of the IP network control plane protocol message into an address field in the OpenFlow control message, where the identification information of the IP network device is a source IP address and/or a source MAC address in the TCP/IP data packet, correspondingly encapsulating, by the OFS, the field value that is in the packet header of the TCP/IP data packet and that is used to determine the protocol type into a field that is used to identify a protocol type and that is in the OpenFlow control message, and encapsulating, by the OFS, the payload information in the TCP/IP data packet into an information field in the OpenFlow control message.

A packet header field in the OpenFlow control message includes an Ethernet type, an IP Protocol type number, and MAC addresses, IP addresses, and destination TCP port numbers of the OFS and the OFC.

Figure 2:
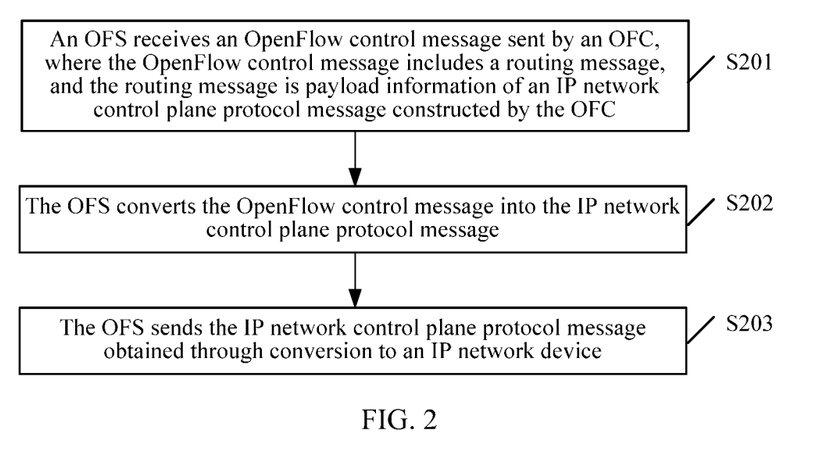
FIG. 2 is a flowchart of Embodiment 2 of a method for communication between an OpenFlow device and an IP network device according to the present disclosure.

FIG. 2 is a flowchart of Embodiment 2 of a method for communication between an OpenFlow device and an IP network device according to an embodiment of the present disclosure. This embodiment is described using an OFS to execute the method. This embodiment is a processing process when the OpenFlow device sends a message to the IP network device. As shown in FIG. 2, the method in this embodiment may include the following steps.

Step S201: The OFS receives an OpenFlow control message sent by an OFC, where the OpenFlow control message includes a routing message, and the routing message is payload information of an IP network control plane protocol message constructed by the OFC.

Step S202: The OFS converts the OpenFlow control message into the IP network control plane protocol message.

Step S203: The OFS sends the IP network control plane protocol message obtained through conversion to the IP network device.

Before the converting, by the OFS, the OpenFlow control message into the IP network control plane protocol message, the method further includes determining, by the OFS according to a message type in the OpenFlow control message, the payload information of the IP network control plane protocol message is encapsulated in the OpenFlow control message.

If the OpenFlow control message further includes a destination IP address corresponding to the IP network control plane protocol message, the converting, by the OFS, the OpenFlow control message into the IP network control plane protocol message may include finding, by the OFS, device identification information of the IP network device from a link connection database according to the destination IP address, where the device identification information includes at least an IP address and/or a MAC address, assigning, by the OFS, the found device identification information of the IP network device to a destination IP network device identification information field in a TCP/IP data packet of the IP network control plane protocol message, assigning, by the OFS, a field value that is used to identify a protocol type and that is in the OpenFlow control message to a corresponding protocol type field in a packet header of the TCP/IP data packet of the IP network control plane protocol message, encapsulating, by the OFS, an information field in the OpenFlow control message into a payload of the TCP/IP data packet of the IP network control plane protocol message, and respectively assigning, by the OFS, an IP address, a MAC address, and a TCP port number of the OFS to a source IP address, a source MAC address, and a TCP port number of the TCP/IP data packet of the IP network control plane protocol message.

The step S203 may include finding, by the OFS from the link connection database according to the destination IP address, a physical port that connects the OFS to the IP network device, and sending, by the OFS, the IP network control plane protocol message obtained through conversion to the IP network device using the found physical port.

This embodiment of the present disclosure provides the method for communication between an OpenFlow device and an IP network device. According to this embodiment of the present disclosure, an OpenFlow control message is used to carry payload information, a field value in a packet header which is used to determine a protocol type, and identification information of the IP network device that are in a TCP/IP data packet of an IP network control plane protocol message in order to encapsulate the IP network control plane protocol message into the OpenFlow control message for transmission between an OFS and an OFC, such that communication between the OpenFlow device and the IP network device can be implemented, the OFC does not need to process a TCP/IP protocol stack twice, and extra overheads of the OFC are avoided.

In addition, the IP network control plane protocol message is reported to the OFC using the OpenFlow control message and the IP network control plane protocol message is delivered to the OFS, such that the IP network control plane protocol message can be separated from a Packet In message and from a Packet Out message for reporting user data, which facilitates distinguishing and processing messages of different functional types by the OFS and the OFC.

The technical solution in the method embodiment shown above is described in detail below using a specific embodiment.

In this embodiment of the present disclosure, for example, the OpenFlow control message is an OFPT_IPCONTROL message. In this embodiment of the present disclosure, based on original 35 message types in the OpenFlow1.4 specification, a brand new message type: an OFPT_IPCON- TROL message is introduced. In this embodiment, a message format of the OFPT_IPCONTROL message is defined as follows:

ofp_header: OpenFlow Header;
router_ip: an IP address of a non-OFS (NOFS) associated with a conventional IP network control plane protocol message encapsulated in the message;
type: a protocol type of the conventional IP network control plane protocol message encapsulated in the message; and
data: the conventional IP network control plane protocol message encapsulated in the message.

A coding format of "type" is defined as follows:
"eth_type": 16 bits, an Ethernet type number, corresponding to an Ethernet type number in a packet header of an IP data packet carried in the conventional IP network control plane protocol message;
"ip_proto": 8 bits, a protocol type number, corresponding to an IP protocol number in the packet header of the IP data packet carried in the conventional IP network control plane protocol message; and
"tcp_port": 16 bits, a destination TCP port number, corresponding to a TCP destination port number in the packet header of the TCP/IP data packet carried in the conventional IP network control plane protocol message.

The following describes a method process in this embodiment of the present disclosure in detail.

When the IP network device sends a message to the OpenFlow device, a processing process of sending a conventional IP network control plane protocol message from the NOFS to the OFC using the OFS is as the following steps:

Step S11: The NOFS sends a conventional IP network control plane protocol message to the OFS.

Step S12: After receiving a data packet sent in S11, the OFS encapsulates a message that is in a payload of the data packet into an OFPT_IPCONTROL message.

The step S12 further performs the following steps:

Step S121: The OFS receives the data packet sent in S11.

Step S122: The OFS determines whether the data packet includes the conventional IP network control plane protocol message, and if yes, perform S123; or if not, perform S125.

Step S123: The OFS extracts key information from the data packet sent in S11 and encapsulates the key information into the OFPT_IPCONTROL message. In an embodiment, the key information encapsulated into the OFPT_IPCONTROL message comprises a Packet Header of the data packet stores information related to the OFS and the OFC, payload Data in the data packet carries an OFPT_IPCONTROL_OF message, "ofp_header" in the OFPT_IPCONTROL is consistent with "ofp_header" in another OpenFlow message, "router_ip" in the OFPT_IPCONTROL is equal to a source IP address in the data packet sent in S11, "type: eth_type" in the OFPT_IPCONTROL is equal to "eth_type" in the data packet sent in S11, "type: ip_proto" in the OFPT_IPCONTROL is equal to "ip_proto" in the data packet sent in S11, "type: tcp_port" in the OFPT_IPCONTROL is equal to a destination TCP port number, for example, ofs_tcp_port, in the data packet sent in S11, and "data" in the OFPT_IPCONTROL is assigned to the Payload Data in the data packet sent in S11, for example, a Border Gateway Protocol update message (BGP).

Step S124: The OFS sends the OFPT_IPCONTROL message encapsulated in S123 to the OFC.

Step S125: The OFS processes the data packet in common coherent logic.

Step S13: The OFS sends the OFPT_IPCONTROL message constructed in S12 to the OFC.

Step S14: After receiving the OFPT_IPCONTROL message sent in S13, the OFC sends the OFPT_IPCONTROL message to a corresponding conventional IP network control plane protocol module for processing. Thereafter, when the OpenFlow device sends a message to the IP network device, a processing process of sending a conventional IP network control plane protocol message from the OFC to the NOFS using the OFS is as the following steps:

Step S21: A conventional IP network control plane protocol module of the OFC constructs a message, and the OFC encapsulates the message into an OFPT_IPCONTROL message, which further performs the following steps:

Step S211: The conventional IP network control plane protocol module of the OFC constructs a message "data", which carries "router_ip".

Step S212: The OFC constructs Payload Data of a data packet: an OFPT_IPCONTROL message according to information in S211, where "ofp_header" in the OFPT_IPCONTRO is consistent with "ofp_header" in another OpenFlow message, "router_ip" in the OFPT_IPCONTRO is equal to "router_ip" in S211, "data" in the OFPT_IPCONTRO is equal to "data" encapsulated in S211, and "type" in the OFPT_IPCONTRO may be obtained through calculation by the conventional IP network control plane protocol module that sends the "data".

Step S213: The OFC constructs a Packet Header of the data packet.

Step S22: The OFC sends the OFPT_PCONTROL message constructed in S21 to the OFS.

Step S23: The OFS converts the OFPT_IPCONTROL message received in S22 into an IP network control plane protocol message of a standard format.

Step S231: The OFS receives the data packet sent by the OFC.

Step S232: The OFS determines whether the data packet includes the OFPT_OF_IPCONTROL, and if yes, perform S123; or if not, perform S125.

Step S233: The OFS extracts key information from the data packet sent in S22 and encapsulates the key information into a corresponding standard IP network control plane protocol message. For example, the key information encapsulated into a corresponding standard IP network control plane protocol message comprises the Packet Header of the data packet stores information related to the OFS and the NOFS, "eth_type" is equal to "type: eth_type" in the OFPT_IPCONTROL sent in S22, "ip_proto" is equal to "type: ip_proto" in the OFPT_IPCONTROL sent in S22, and "destination port number" is equal to "type: tcp_port" in the OFPT_IPCONTROL sent in S22.

A link connection database (LCDB) is searched for corresponding "MAC" and "IP" using "router id" as an index and the corresponding "MAC" and "IP" are assigned to a destination MAC address and an IP address that are in the OFPT_IPCONTROL. A source MAC address and an IP address are respectively a MAC address and an IP address of the OFS, and a source TCP port number may be allocated in a particular mechanism.

Step S234: The OFS sends the standard IP network control plane protocol message encapsulated in S233 to the NOFS.

Step S2341: Search the LCDB using "router id" as an index for a number of a physical port directly connected to the NOFS on the OFS.

Step S2342: The OFS forwards, from the physical port acquired in S2341, the standard IP network control plane protocol message encapsulated in S233.

Step S235: The OFS processes the data packet in common coherent logic.

Step S24: The OFS sends the IP network control plane protocol message in S23 to the NOFS.

Figure 3:
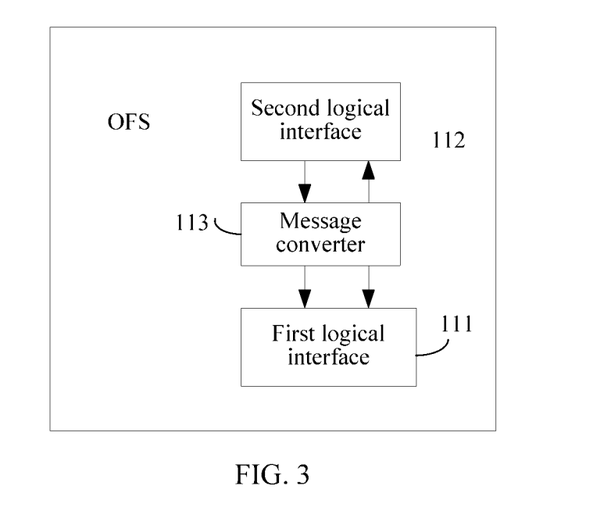
FIG. 3 is a schematic structural diagram of Embodiment 1 of an OFS according to the present disclosure.

FIG. 3 is a schematic structural diagram of Embodiment 1 of an OFS according to an embodiment of the present disclosure. As shown in FIG. 3, the OFS in this embodiment includes at least one first logical interface 111 connected to an IP network device, at least one second logical interface 112 connected to an OFC, and a message converter 113.

The first logical interface 111 is configured to receive an IP network control plane protocol message sent by the IP network device and forward the IP network control plane protocol message to the message converter. The message converter 113 is configured to convert the IP network control plane protocol message into an OpenFlow control message, where the OpenFlow control message is used to carry information about a TCP/IP data packet of the IP network control plane protocol message, and the information about the TCP/IP data packet includes payload information, a field value that is in a packet header and that is used to determine a protocol type, and identification information of the IP network device. The message converter 113 is further configured to send the OpenFlow control message to the second logical interface 112. The second logical interface 112 is configured to send the OpenFlow control message to the OFC, such that after receiving the OpenFlow control message, the OFC enables, according to the protocol type carried in the OpenFlow control message, a corresponding switched network control plane protocol component to process the OpenFlow control message.

That the message converter 113 may be configured to encapsulate the identification information of the IP network device in the TCP/IP data packet of the IP network control plane protocol message into an address field in the OpenFlow control message, where the identification information of the IP network device is a source IP address and/or a source MAC address in the TCP/IP data packet, correspondingly encapsulate the field value that is in the packet header of the TCP/IP data packet and that is used to determine the protocol type into a field that is used to identify a protocol type and that is in the OpenFlow control message, and encapsulate the payload information in the TCP/IP data packet into an information field in the OpenFlow control message.

A packet header field in the OpenFlow control message includes information such as an Ethernet type, an IP type number, and MAC addresses, IP addresses, and destination TCP port numbers of the OFS and the OFC.

The OFS provided in this embodiment may be configured to perform the technical solution in the method embodiment shown in FIG. 1, and their implementation principles are similar, which are not described in detail herein again.

This embodiment of the present disclosure provides the OFS. According to this embodiment of the present disclosure, an OpenFlow control message is used to carry payload information, a field value that is in a packet header and that is used to determine a protocol type, and identification information of an IP network device that are in a TCP/IP data packet of an IP network control plane protocol message in order to encapsulate the IP network control plane protocol message into the OpenFlow control message for transmission between an OFS and an OFC, such that communication between the OpenFlow device and the IP network device can be implemented, the OFC does not need to process a TCP/IP protocol stack twice, and extra overheads of the OFC are avoided.

In addition, the IP network control plane protocol message is reported to the OFC using the OpenFlow control message and the IP network control plane protocol message is delivered to the OFS, such that the IP network control plane protocol message can be separated from a Packet In message and from a Packet Out message for reporting user data, which facilitates distinguishing and processing messages of different functional types by the OFS and the OFC.

Figure 4:
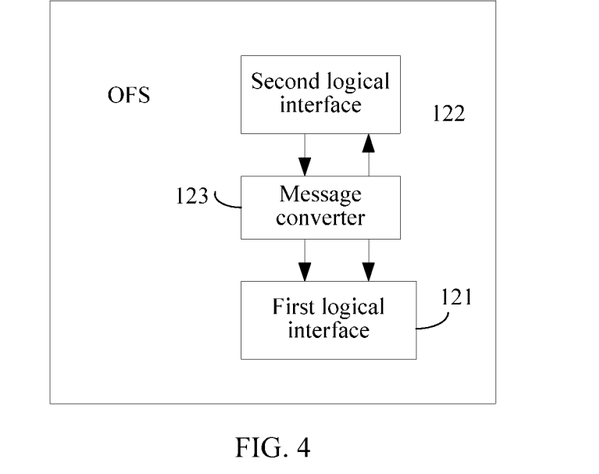
FIG. 4 is a schematic structural diagram of Embodiment 2 of an OFS according to the present disclosure.

FIG. 4 is a schematic structural diagram of Embodiment 2 of an OFS according to an embodiment of the present disclosure. As shown in FIG. 4, the OFS in this embodiment includes at least one first logical interface 121 connected to an IP network device, at least one second logical interface 122 connected to an OFC, and a message converter 123. The second logical interface 122 is configured to receive an OpenFlow control message sent by the OFC, where the OpenFlow control message includes a routing message, and the routing message is payload information of an IP network control plane protocol message constructed by the OFC, and forward the OpenFlow control message to the message converter 123. The message converter 123 is configured to convert the OpenFlow control message into the IP network control plane protocol message and send the IP network control plane protocol message obtained through conversion to the first logical interface 121. The first logical interface 121 is configured to send the IP network control plane protocol message obtained through conversion to the IP network device.

Further, the message converter 123 is further configured to determine, according to a message type in the OpenFlow control message, that the payload information of the IP network control plane protocol message is encapsulated in the OpenFlow control message before converting the OpenFlow control message into the IP network control plane protocol message.

Figure 5:
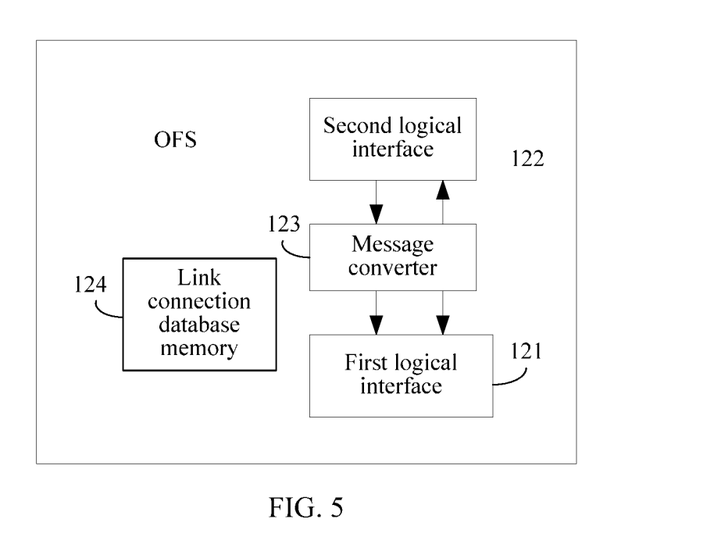
FIG. 5 is a schematic structural diagram of Embodiment 3 of an OFS according to the present disclosure.

FIG. 5 is a schematic structural diagram of Embodiment 3 of an OFS according to an embodiment of the present disclosure. As shown in FIG. 5, further, based on the structure shown in FIG. 4, the OFS in this embodiment further includes a link connection database memory 124, where the link connection database memory 124 is configured to store the OpenFlow control message in a link connection database. Moreover, if the OpenFlow control message further includes a destination IP address corresponding to the IP network control plane protocol message, the message converter 123 may be configured to find device identification information of the IP network device from the link connection database according to the destination IP address, where the device identification information includes at least an IP address and/or a MAC address, assign the found device identification information of the IP network device to a destination IP network device identification information field in a TCP/IP data packet of the IP network control plane protocol message, assign a field value that is used to identify a protocol type and that is in the OpenFlow control message to a corresponding protocol type field in a packet header of the TCP/IP data packet of the IP network control plane protocol message, encapsulate an information field in the OpenFlow control message into a payload of the TCP/IP data packet of the IP network control plane protocol message, and respectively assign an IP address, a MAC address, and a TCP port number of the OFS to a source IP address, a source MAC address, and a TCP port number of the TCP/IP data packet of the IP network control plane protocol message.

The first logical interface 121 is configured to find, from the link connection database according to the destination IP address, a physical port that connects the OFS to the IP network device, and send the IP network control plane protocol message obtained through conversion to the IP network device using the found physical port.

The OFS provided in this embodiment may be configured to perform the technical solution in the method embodiment shown in FIG. 2, and their implementation principles are similar, which are not described in detail herein again.

This embodiment of the present disclosure provides the OFS. According to this embodiment of the present disclosure, an OpenFlow control message is used to carry payload information, a field value that is in a packet header and that is used to determine a protocol type, and identification information of an IP network device that are in a TCP/IP data packet of an IP network control plane protocol message in order to encapsulate the IP network control plane protocol message into the OpenFlow control message for transmission between an OFS and an OFC, such that communication between the OpenFlow device and the IP network device can be implemented, the OFC does not need to process a TCP/IP protocol stack twice, and extra overheads of the OFC are avoided.

In addition, the IP network control plane protocol message is reported to the OFC using the OpenFlow control message and the IP network control plane protocol message is delivered to the OFS, such that the IP network control plane protocol message can be separated from a Packet In message and from a Packet Out message for reporting user data, which facilitates distinguishing and processing messages of different functional types by the OFS and the OFC.

A system for communication between an OpenFlow device and an IP network device provided in an embodiment of the present disclosure includes the OFS and the OFC shown in FIG. 3, where the OFS is connected to the OFC, and the OFC is configured to receive an OpenFlow control message, and enable, according to a protocol type carried in the OpenFlow control message, a corresponding switched network control plane protocol component to process the OpenFlow control message; or a system for communication between an OpenFlow device and an IP network device provided in an embodiment of the present disclosure includes the OFS and the OFC shown in FIG. 4, where the OFC is configured to send an OpenFlow control message to the OFS, where the OpenFlow control message includes a routing message, and the routing message is payload information of an IP network control plane protocol message constructed by the OFC.

Figure 6:
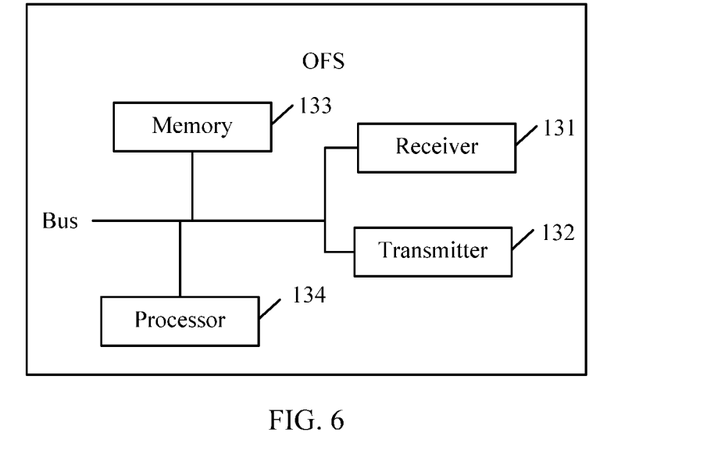
FIG. 6 is a schematic structural diagram of Embodiment 4 of an OFS according to the present disclosure.

FIG. 6 is a schematic structural diagram of Embodiment 4 of an OFS according to an embodiment of the present disclosure. As shown in FIG. 6, the OFS in this embodiment includes a receiver 131 connected to an IP network device, and a transmitter 132, a memory 133, and a processor 134 (there may be one or more processors 134, and in FIG. 5, one processor is used as an example) that are connected to an OFC. In this embodiment of the present disclosure, the receiver 131, and the transmitter 132, the memory 133, and the processor 134 may be connected using a bus or in another manner, where a connection using a bus is used as an example in FIG. 5. The receiver 131 is configured to receive an IP network control plane protocol message sent by the IP network device and forward the IP network control plane protocol message to the processor 134. The memory 133 is configured to store program code. The processor 134 is configured to invoke the program code stored in the memory 133, to converting the IP network control plane protocol message into an OpenFlow control message, where the OpenFlow control message is used to carry information about a TCP/IP data packet of the IP network control plane protocol message, and the information about the TCP/IP data packet includes payload information, a field value that is in a packet header and that is used to determine a protocol type, and identification information of the IP network device, and send the OpenFlow control message to the transmitter.

The transmitter 132 is configured to send the OpenFlow control message to the OFC, such that after receiving the OpenFlow control message, the OFC enables, according to the protocol type carried in the OpenFlow control message, a corresponding switched network control plane protocol component to process the OpenFlow control message.

The converting, by the processor 134, the IP network control plane protocol message into an OpenFlow control message may be encapsulating the identification information of the IP network device in the TCP/IP data packet of the IP network control plane protocol message into an address field in the OpenFlow control message, where the identification information of the IP network device is a source IP address and/or a source MAC address in the TCP/IP data packet, correspondingly encapsulating the field value that is in the packet header of the TCP/IP data packet and that is used to determine the protocol type into a field that is used to identify a protocol type and that is in the OpenFlow control message, and encapsulating the payload information in the TCP/IP data packet into an information field in the OpenFlow control message.

A packet header field in the OpenFlow control message includes information such as an Ethernet type, an IP type number, and MAC addresses, IP addresses, and TCP port numbers of the OFS and the OFC.

The OFS provided in this embodiment may be configured to perform the technical solution in the method embodiment shown in FIG. 1, and their implementation principles are similar, which are not described in detail herein again.

This embodiment of the present disclosure provides the OFS. According to this embodiment of the present disclosure, an OpenFlow control message is used to carry payload information, a field value that is in a packet header and that is used to determine a protocol type, and identification information of an IP network device that are in a TCP/IP data packet of an IP network control plane protocol message in order to encapsulate the IP network control plane protocol message into the OpenFlow control message for transmission between an OFS and an OFC, such that communication between the OpenFlow device and the IP network device can be implemented, the OFC does not need to process a TCP/IP protocol stack twice, and extra overheads of the OFC are avoided.

In addition, the IP network control plane protocol message is reported to the OFC using the OpenFlow control message and the IP network control plane protocol message is delivered to the OFS, such that the IP network control plane protocol message can be separated from a Packet In message and from a Packet Out message for reporting user data, which facilitates distinguishing and processing messages of different functional types by the OFS and the OFC.

Figure 7:
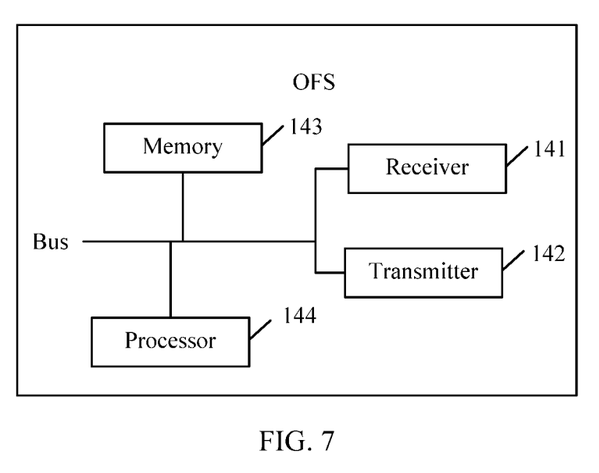
FIG. 7 is a schematic structural diagram of Embodiment 5 of an OFS according to the present disclosure.

FIG. 7 is a schematic structural diagram of Embodiment 5 of an OFS according to the present disclosure. As shown in FIG. 7, the OFS in this embodiment includes a receiver 141 connected to an IP network device, and a transmitter 142, a memory 143, and a processor 144 (there may be one or more processors 144, and in FIG. 6, one processor is used as an example) that are connected to an OFC. In this embodiment of the present disclosure, the receiver 141, the transmitter 142, the memory 143, and the processor 144 may be connected using a bus or in another manner, where a connection using a bus is used as an example in FIG. 6. The receiver 141 is configured to receive an OpenFlow control message sent by the OFC, where the OpenFlow control message includes a routing message, and the routing message is payload information of an IP network control plane protocol message constructed by the OFC, and forward the OpenFlow control message to the processor 144. The memory 143 is configured to store program code. The processor 144 is configured to invoke the program code stored in the memory, to converting the OpenFlow control message into the IP network control plane protocol message, and sending the IP network control plane protocol message obtained through conversion to the transmitter 142.

The transmitter 142 is configured to send the IP network control plane protocol message obtained through conversion to the IP network device.

The memory 143 is further configured to store the OpenFlow control message in a link connection database.

The processor 144 is further configured to determine, according to a message type in the OpenFlow control message, that the payload information of the IP network control plane protocol message is encapsulated in the OpenFlow control message before converting the OpenFlow control message into the IP network control plane protocol message.

If the OpenFlow control message further includes a destination IP address corresponding to the IP network control plane protocol message, the converting, by the processor 144, the OpenFlow control message into the IP network control plane protocol message includes finding device identification information of the IP network device from the link connection database according to the destination IP address, where the device identification information includes at least an IP address and/or a MAC address, assigning the found device identification information of the IP network device to a destination IP network device identification information field in a TCP/IP data packet of the IP network control plane protocol message, assigning a field value that is used to identify a protocol type and that is in the OpenFlow control message to a corresponding protocol type field in a packet header of the TCP/IP data packet of the IP network control plane protocol message, encapsulating an information field in the OpenFlow control message into a payload of the TCP/IP data packet of the IP network control plane protocol message, and respectively assigning an IP address, a MAC address, and a TCP port number of the OFS to a source IP address, a source MAC address, and a TCP port number of the TCP/IP data packet of the IP network control plane protocol message.

That the transmitter 142 may be configured to find, from the link connection database according to the destination IP address, a physical port that connects the OFS to the IP network device, and send the IP network control plane protocol message obtained through conversion to the IP network device using the found physical port.

The OFS provided in this embodiment may be configured to perform the technical solution in the method embodiment shown in FIG. 2, and their implementation principles are similar, which are not described in detail herein again.

This embodiment of the present disclosure provides the OFS. According to this embodiment of the present disclosure, an OpenFlow control message is used to carry payload information, a field value that is in a packet header and that is used to determine a protocol type, and identification information of an IP network device that are in a TCP/IP data packet of an IP network control plane protocol message in order to encapsulate the IP network control plane protocol message into the OpenFlow control message for transmission between an OFS and an OFC, such that communication between the OpenFlow device and the IP network device can be implemented, the OFC does not need to process a TCP/IP protocol stack twice, and extra overheads of the OFC are avoided.

In addition, the IP network control plane protocol message is reported to the OFC using the OpenFlow control message and the IP network control plane protocol message is delivered to the OFS, such that the IP network control plane protocol message can be separated from a Packet In message and from a Packet Out message for reporting user data, which facilitates distinguishing and processing messages of different functional types by the OFS and the OFC.

A system for communication between an OpenFlow device and an IP network device provided in an embodiment of the present disclosure includes the OFS and the OFC shown in FIG. 5, where the OFS is connected to the OFC, and the OFC is configured to receive an OpenFlow control message, and enable, according to a protocol type carried in the OpenFlow control message, a corresponding switched network control plane protocol component to process the OpenFlow control message or a system for communication between an OpenFlow device and an IP network device provided in an embodiment of the present disclosure includes the OFS and the OFC shown in FIG. 6, where the OFC is configured to send an OpenFlow control message to the OFS, where the OpenFlow control message includes a routing message, and the routing message is payload information of an IP network control plane protocol message constructed by the OFC.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present disclosure. The foregoing storage medium includes any medium that can store program code, such as a Universal Serial Bus (USB) flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method implemented by an OpenFlow switch (OFS), the method comprising:
   receiving, from an Internet Protocol (IP) network device, an IP network control plane protocol message;
   converting the IP network control plane protocol message into an OpenFlow control message comprising information about a Transmission Control Protocol/IP (TCP/IP) data packet, wherein the information comprises payload information, a field value that is in a packet header and is used to determine a protocol type, and identification information of the IP network device, and wherein the converting comprises encapsulating the identification information into an address field in the OpenFlow control message; and
   sending the OpenFlow control message to an OpenFlow controller (OFC) for the OFC to enable, according to the protocol type, a corresponding switched network control plane protocol component to process the OpenFlow control message.

2. The method of claim 1, wherein the converting further comprises:
   encapsulating the field value into a field in the OpenFlow control message that is used to identify a protocol type; and
   encapsulating the payload information into an information field in the OpenFlow control message.

3. The method of claim 2, wherein a packet header field in the OpenFlow control message comprises an Ethernet type, an IP type number, and media access control (MAC) addresses, IP addresses, and destination TCP port numbers of the OFS and the OFC.

4. A method implemented by an OpenFlow switch (OFS), the method comprising:
   receiving from an OpenFlow controller (OFC) an OpenFlow control message comprising a routing message and a destination IP address, wherein the routing message is payload information of an Internet Protocol (IP) network control plane protocol message constructed by the OFC, and wherein the destination IP address corresponds to the IP network control plane protocol message;
   converting the OpenFlow control message into the IP network control plane protocol messagemessage by:
      finding, according to the destination IP address, device identification information of an IP network device from a link connection database,
      assigning the device identification information to a destination IP network device identification information field in a Transmission Control Protocol/Internet Protocol (TCP/IP) data packet of the IP network control plane protocol message,
      assigning, to a corresponding protocol type field in a packet header of the TCP/IP data packet, a field value in the OpenFlow control message that identifies a protocol type,
      encapsulating an information field in the OpenFlow control message into a payload of the TCP/IP data packet, and
      assigning an IP address, a media access control (MAC) address, and a TCP port number of the OFS to a source IP address, a source MAC address, and a TCP port number of the TCP/IP data packet, respectively; and
   sending the IP network control plane protocol message to the IP network device.

5. The method of claim 4, wherein, before the converting, the method further comprises determining, according to a message type in the OpenFlow control message, that the payload information of the IP network control plane protocol message is encapsulated in the OpenFlow control message.

6. The method of claim 4, wherein the sending comprises:
   finding, from the link connection database according to the destination IP address, a physical port that connects the OFS to the IP network device; and
   sending the IP network control plane protocol message to the IP network device using the physical port.

7. An OpenFlow switch (OFS) comprising:
   a memory; and
   a processor coupled to the memory and configured to:
      receive an Internet Protocol (IP) network control plane protocol message from an IP network device;
      convert the IP network control plane protocol message into an OpenFlow control message, comprising information about a Transmission Control Protocol/IP (TCP/IP) data packet, wherein the information comprises payload information, a field value that is in a packet header and is used to determine a protocol type, and identification information of the IP network device;
      encapsulate the identification information into an address field in the OpenFlow control message; and
      send the OpenFlow control message to an OpenFlow controller (OFC) for the OFC to enable, according to the protocol type, a corresponding switched network control plane protocol component to process the OpenFlow control message.

8. The OFS of claim 7, wherein the processor is further configured to:

encapsulate the field value into a field in the OpenFlow control message that is used to identify a protocol type; and encapsulate the payload information into an information field in the OpenFlow control message.

9. The OFS of claim 8, wherein a packet header field in the OpenFlow control message comprises an Ethernet type, an IP type number, and media access control (MAC) addresses, IP addresses, and destination TCP port numbers of the OFS and the OFC.

10. An OpenFlow switch (OFS) comprising:
a memory; and
a processor coupled to the memory and configured to:
receive from an OpenFlow controller (OFC) an OpenFlow control message comprising a routing message and a destination IP address, wherein the routing message is payload information of an Internet Protocol (IP) network control plane protocol message constructed by the OFC, and wherein the destination IP address corresponds to the IP network control plane protocol message;
convert the OpenFlow control message into the IP network control plane protocol message;
find, according to the destination IP address, device identification information of an IP network device from a link connection database;
assign the device identification information to a destination IP network device identification information field in a Transmission Control Protocol/Internet Protocol (TCP/IP) data packet of the IP network control plane protocol message;
assign, to a corresponding protocol type field in a packet header of the TCP/IP data packet, a field value in the OpenFlow control message that identifies a protocol type;
encapsulate an information field in the OpenFlow control message into a payload of the TCP/IP data packet;
assign an IP address, a media access control (MAC) address, and a TCP port number of the OFS to a source IP address, a source MAC address, and a TCP port number of the TCP/IP data packet, respectively; and
send the IP network control plane protocol message to the IP network device.

11. The OFS of claim 10, wherein, before the converting, the processor is further configured to determine, according to a message type in the OpenFlow control message, that the payload information of the IP network control plane protocol message is encapsulated in the OpenFlow control message.

12. The OFS of claim 10, wherein the processor is further configured to:
find, from the link connection database according to the destination IP address, a physical port that connects the OFS to the IP network device; and
send the IP network control plane protocol message to the IP network device using the physical port.

13. A system comprising:
an OpenFlow switch (OFS) configured to:
receive an Internet Protocol (IP) network control plane protocol message from an IP network device;
convert the IP network control plane protocol message into an OpenFlow control message comprising information about a Transmission Control Protocol/IP (TCP/IP) data packet, wherein the information comprises payload information, a field value that is in a packet header and is used to determine a protocol type, and identification information of the IP network device;
encapsulate the identification information into an address field in the OpenFlow control message; and
send the OpenFlow control message; and
an OpenFlow controller (OFC) configured to:
receive the OpenFlow control message from the OFS; and
enable, according to the protocol type, a corresponding switched network control plane protocol component to process the OpenFlow control message.

14. The system of claim 13, wherein the OFS is further configured to:
encapsulate the field value into a field in the OpenFlow control message that is used to identify a protocol type; and
encapsulate the payload information into an information field in the OpenFlow control message.

15. The system of claim 14, wherein a packet header field in the OpenFlow control message comprises an Ethernet type, an IP type number, and media access control (MAC) addresses, IP addresses, and destination TCP port numbers of the OFS and the OFC.

16. A system comprising:
an OpenFlow controller (OFC); and
an OpenFlow switch (OFS) configured to:
receive from the OFC an OpenFlow control message comprising a routing message and a destination IP address, wherein the routing message is payload information of an Internet Protocol (IP) network control plane protocol message constructed by the OFC, and wherein the destination IP address corresponds to the IP network control plane protocol message;
convert the OpenFlow control message into the IP network control plane protocol message;
find, according to the destination IP address, device identification information of an IP network device from a link connection database;
assign the device identification information to a destination IP network device identification information field in a Transmission Control Protocol/Internet Protocol (TCP/IP) data packet of the IP network control plane protocol message;
assign, to a corresponding protocol type field in a packet header of the TCP/IP data packet, a field value in the OpenFlow control message that identifies a protocol type;
encapsulate an information field in the OpenFlow control message into a payload of the TCP/IP data packet;
assign an IP address, a media access control (MAC) address, and a TCP port number of the OFS to a source IP address, a source MAC address, and a TCP port number of the TCP/IP data packet, respectively; and
send the IP network control plane protocol message to the IP network device.

17. The system of claim 16, wherein before the converting, the OFS is further configured to determine, according to a message type in the OpenFlow control message, that the payload information of the IP network control plane protocol message is encapsulated in the OpenFlow control message.

18. The system of claim 16, wherein the OFS is further configured to:

find, from the link connection database according to the destination IP address, a physical port that connects the OFS to the IP network device; and send the IP network control plane protocol message to the IP network device using the physical port.

* * * * *

UNITED STATES PATENT AND TRADEMARK OFFICE
CERTIFICATE OF CORRECTION

PATENT NO. : 10,182,132 B2
APPLICATION NO. : 15/333714
DATED : January 15, 2019
INVENTOR(S) : Xiuli Zheng Page 1 of 1

It is certified that error appears in the above-identified patent and that said Letters Patent is hereby corrected as shown below:

In the Claims

Column 20, Line 10 Claim 4: "messagemessage" should read "message"

Signed and Sealed this
Fifth Day of March, 2019

Andrei Iancu
*Director of the United States Patent and Trademark Office*